United States Patent Office 3,346,784
Patented Oct. 10, 1967

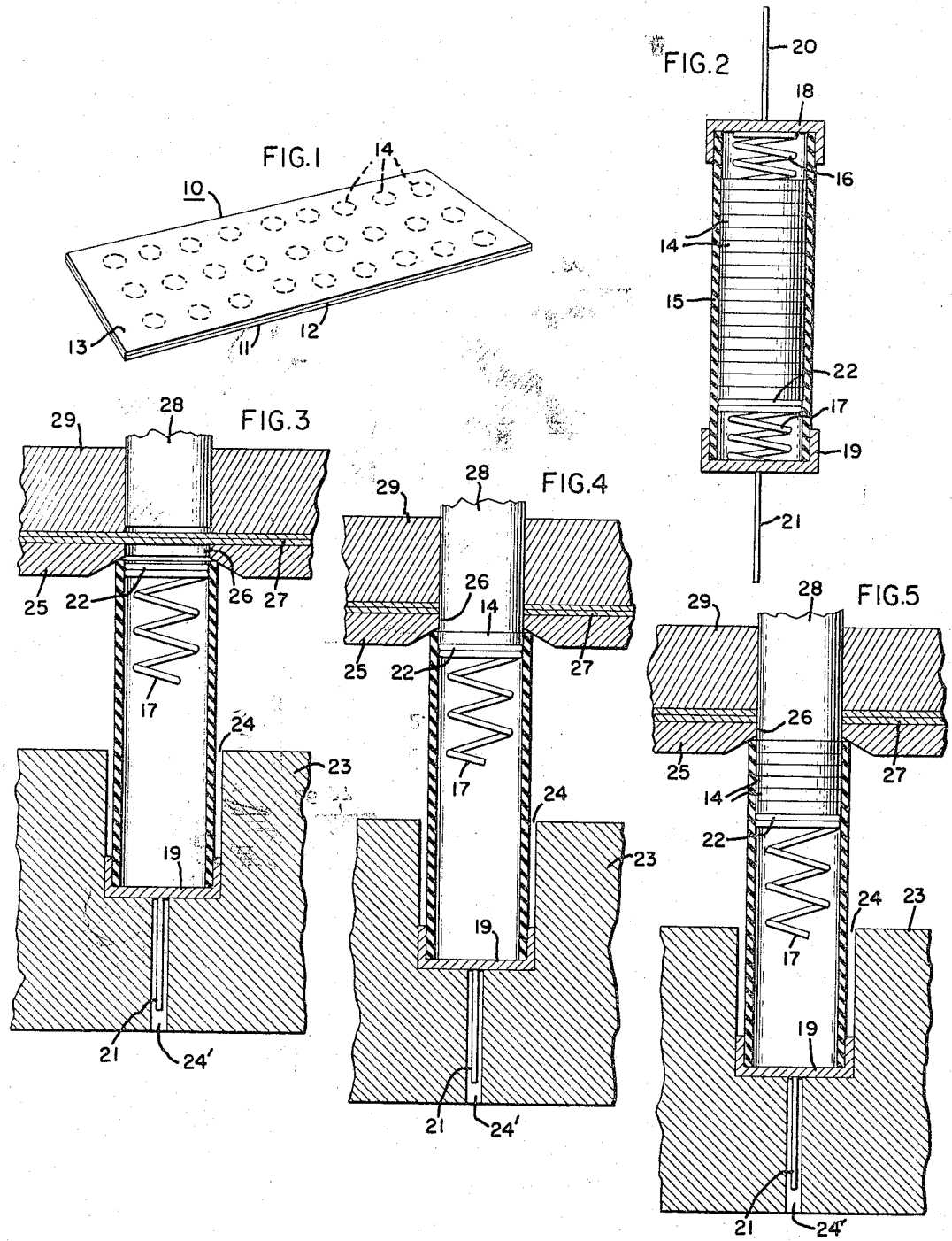

3,346,784
MINIATURE RECTIFIER AND METHOD
OF MANUFACTURE
Robert W. Blake, Lynchburg, Va., assignor to General
Electric Company, a corporation of New York
Filed June 9, 1965, Ser. No. 462,579
5 Claims. (Cl. 317—234)

ABSTRACT OF THE DISCLOSURE

The invention relates to a structure and method of producing cartridge type rectifiers having a number of rectifier cells in a tubular cartridge between spring members which force the cells together. At least one of the spring members is provided with at least one coil adjacent the cells with an outside diameter slightly larger than the remaining coils and also slightly larger than the minimum interior dimension of the tubular cartridge. The method of producing the cartridge includes putting such a coil spring member inside the tubular cartridge with its larger turn or turns at the open face of the cartridge and punching the rectifier cells into the cartridge against the frictional engagement of the larger turns of the spring within the cartridge whereby the spring acts as a frictional follower. The proper number of cells are punched into the tube and another spring is inserted in the tube and the tube is capped so that rectifier cells are held between the pressure of the springs.

---

The present invention relates to recifiers of the cartridge type and to a method for producing such rectifier. The invention is particularly useful in connection with stacked selenium rectifiers.

Individual selenium rectifier cells have a relatively low voltage blocking capability, e.g., on the order of 35 volts. In order to obtain higher blocking voltages, the individual cells are frequently stacked in series and placed in an insulated tube with conductive leads at opposite ends to form what is known as a cartridge type package.

A number of methods are known for producing such rectifier stacks but most of the known methods result in rectifier structures which are relatively expensive due to time consuming and costly manufacture and assembly procedures. One such method involves spraying colored dye on the back of rectifier cell sheet stock in order to identify the polarity, punching the cells out of the sheet stock, tumbling the cells to remove excess material, and hand loading the individual rectifier cells into holding tubes which contain follower rods. The column of cells so stacked are then pushed from the holding tubes to a capped rectifier tubular housing with a follower rod and a compression contact spring is inserted. The open end of the tube is capped in order to complete the cartridge type rectifier stack.

This method is obviously time consuming and costly. It is an object of the present invention to eliminate disadvantages of the method described above by providing a structure which allows the individual rectifier cells to be punched from sheet stock directly into the final cartridge tube and also provide a method for assembling the structure.

Another method for assembling such a rectifier involves placing uncapped tubes in a fixture which is provided with a follower drag rod designed to keep the individual cells from turning over as they are inserted. The cells are punched against the drag rod to load the fixture. The loaded fixture is placed in an ultrasonic cleaner to remove particles from the cells after which the tubes are capped on one end, inverted, compression springs added and the tubes are capped on the other end. This method allows loading the cells directly in the cartridge tubes but requires expensive tooling and parts which must be removed from the loaded tube.

It is an object of the present invention to overcome shortcomings of the above described method by providing a rectifier stack design wherein the individual cells may be loaded directly into the cartridge housing and the means for preventing the cells from inverting in the housing constitutes a part of the finished rectifier.

In another method for producing cartridge type rectifiers, the housing tubes are capped at one end with a cap having aperture to allow the insertion of a follower rod. The cells are punched against the follower rod which prevents inversion of the cells. Once the cells are stacked in the tube, the follower rod is removed and a spring and cap are added to complete the assembly. Again, this method requires extra fixtures and the fact that one of the caps has an aperture in it allows moisture and contaminants to get into the assembly unless the apertures are subsequently sealed by additional operations.

A further object of the invention is to eliminate the difficulties and problems encountered with all of the previous methods of assembly by providing a structure wherein parts used in the stacking form parts of the completed rectifier and end caps do not need to be sealed.

In carrying out the invention, a tubular housing is provided for the rectifier stack. The housing is provided with an end cap and a coil spring having at least one coil with an outside diameter slightly larger than that of the remaining coils is inserted in the open end of the tubular housing with the smaller coils extending away from the open end of the tube. The individual rectifier cells are punched from sheet stock directly into the open end of the tube on to the spring so that each cell punched into the tube moves the coil follower spring down. Thus, the follower spring follows the punched cells through the tube and prevents them from turning over. The follower spring comes to rest against the cap on the closed end of the tube making an electrical contact which is not broken by vibration or temperature changes. A compression spring is inserted in the other end of the tube to maintain contact pressure during assembly and the open end of the tube is capped to complete the assembly and provide the opposite contact.

For a better understanding of the invention along with the objects and advantages thereof, reference is had to the following detail description to be read in conjunction with the accompanying drawing in which:

FIGURE 1 is a perspective view of sheet stock which constitutes a selenium rectifier from which individual cells are punched;

FIGURE 2 is a central vertical section taken through a typical cartridge type stacked selenium rectifier of the type contemplated herein; and FIGURES 3, 4 and 5 are broken away central vertical sections through a cartridge type rectifier as illustrated in FIGURE 2 in position in a jig and showing a punch and various stages of the punching operation used in loading the cartridge type rectifier.

Referring specifically to FIGURE 1, there is shown a perspective view of a typical selenium rectifier sheet stock before it is die punched into individual cells. The plate 10 consists of a front electrode or base layer 11, typically etched aluminum or steel which may be nickel or bismuth plated. A thin film 12 of amorphous selenium on one side of the base layer and a counter-electrode 13 typically of cadmium or a tin alloy on the selenium surface. Formation of such rectifier sheet stock is well known in the art and does not constitute a part of the present invention. Any suitable rectifier sheet stock may be used.

In the die punching process explained later, the plate 10 is die cut into coins or discs (indicated by dotted circles on the plate) each of which constitutes a single cell. An entire transverse row of cells may be cut from the stock with one multiple punch operation and the individual cell 14 stacked to provide a desired voltage.

FIGURE 2 shows a stack of cells 14 arranged in a cartridge rectifier of the type contemplated by the invention. The cartridge includes a tubular casing 15 of insulating material (e.g., a paper base phenolic tubing or fiberglass) the stack of cells 14 are compression mounted in face-to-face contact by mounting them between a pair of coil springs 16 and 17 which are compressed in the tubing 15 between upper and lower cup shaped end caps 18 and 19 respectively. Typically the end caps are pressure mounted around the tubing 15. Both end caps are conductive and may be used as conductive terminals for the cartridge or as illustrated here, the end caps 18 and 19 may be provided with conductive leads 20 and 21 respectively.

One of the springs (16 in the drawing) may have any configuration. However, in order to make one of the springs 17 provide the function of a follower to prevent individual cells from inverting as they are put in the tube 15, it is provided with one or more turns 22 which are larger than the remaining coils. These turns 22 are slightly larger than the minimum interior dimension across the tube 15. This action as a follower is explained in more detail in connection with the description of the method of assembling the rectifier.

The steps of the method of assembling the rectifier are illustrated somewhat diagrammatically in FIGURES 3, 4 and 5. A cartridge tube 15 which has one end cap 19 already mounted on it is provided with a follower coil spring 17 which, as previously described, has turns 22 which are slightly larger than the minimum interior dimension across the tube 15. The spring 17 is inserted in the open end of the tube 15 in such a manner that the smaller coils of the spring extend downwardly toward the capped end of the tube and the spring is held just inside the open end of the tube by the frictional engagement of the large turns 22. This assembly is then positioned in a plate-like retaining jig 23 which is provided with a bore 24 in its upper surface large enough to receive the assembly including the end cap 19 and which is provided with a centrally located smaller bore 24 in the bottom of the larger bore 24 to receive the lead 21 on the end cap.

In order to die cut the individual cells 14, a conventional die punch machine may be used. Any number of die punches may be used, however, in the illustration, only one die station is shown. Here a die plate 25 is provided with a die aperture 26. The lower surface of the die plate is chamfered around the die aperture to form a guide for registering the upper end of the cartridge tube 15 with the die punch aperture 26.

A plate of the rectifier sheet stock 27 is placed on the die plate 25 and the die plate and sheet stock 27 are positioned under the die punch 28 and stripper plate 29. The die punch 28, of course, is provided for the purpose of punching the rectifier elements 14 and the stripper plate 29 performs the usual stripper plate function of holding the sheet stock 27 in place when working.

The rectifier retaining jig 23 is brought in position under the die plate 25 so that the open aperture of the tube 15 is directly under the die aperture 26. FIGURE 4 shows die punch 28 in its down position and forcing the first rectifier element 14 into place in the open end of the tube 15. As illustrated, the follower spring 17 is moved down by the rectifier element 14 and prevents the rectifier element 14 from inverting when the die punch 28 is moved back. The sheet stock then is moved to another position and the die punch 28 is again lowered to cut another rectifier element 14, and this is continued until the desired number of rectifier elements 14 are in the open end of the tube 15.

If desired, conductive spacers may be punched prior to and after punching rectifier elements 14. It may be desirable to punch conductive spacers for a number of reasons. For example, it may be necessary to provide a number of additional elements in the tube so that the springs 16 and 17 will provide the desired compression on the included rectifier elements or they may be used as assurance that the first cells punched will not turn over or invert.

After the desired number of rectifier elements are punched into the tube 15 and the elements are moved down in the tube 15 until tapered spring 22 is in contact with the conductive cap 19, the assembly is removed from the retaining jig 23 and the upper spring is placed in the open end of the tube (as upper spring 16 in FIGURE 2) and the upper cap 18 is press fit around the open end of the tube 15 to seal the entire unit.

While particular embodiments of the invention have been shown it will, of course, be understood that the invention is not limited thereto since many modifications may be made. It is contemplated that the appended claims will cover any such modifications as fall within the true spirit and scope of the invention.

What I claim as new and desire to secure by Letters Patent of the United States is:

1. A rectifier assembly including a tube of insulating material, end caps on both ends of said tube and forming an enclosure therewith, a stack of rectifier elements and a pair of conductive spring members inside said tube, said stack of rectifier elements being located between said spring members, said spring members located between and held in compression by said end caps whereby said rectifier stack is held in compression, at least one of said spring members comprising a coil spring having at least one coil with an outside diameter slightly larger than that of the remaining coils and also slightly larger than the minimum interior dimension across said tube so as to retain the spring within the tube by resilient engagement with the interior surface thereof, the remaining coils of said spring extending away from said rectifier stack toward one of said end caps.

2. In a rectifier assembly, the combination of a tube of insulating material, a pair of end caps at opposite ends of said tube and forming a closure therefor, a stack of rectifier elements in said tube, and pressure means for holding said rectifier stack in compression between said end caps, said pressure means including at least one coil spring located between one end cap and said stack, said spring having at least one coil which has an outside diameter larger than that of the remaining coils and also slightly larger than the minimum interior dimension of said tube so as to retain the spring within the tube by resilient engagement with the interior surface thereof, the remaining coils of said spring extending away from said rectifier stack and toward the adjacent end cap.

3. The method of assembling cartridge type rectifiers in a housing tube having one end capped and a coil spring having at least one coil with an outside diameter slightly larger than the minimum interior dimension across said tube to provide a position retaining frictional engagement inside said tube and the remaining turns of said coil extending toward said capped end, the method including forcing rectifier elements into said tube thereby displacing said coil spring correspondingly toward said capped end, inserting a compression spring in said tube over said rectifier elements to maintain contact pressure between both said springs and capping the open end of said tube to close the tube housing and maintain said contact pressure between said springs, rectifier elements and end caps.

4. The method of assembling cartridge type rectifiers in a housing tube having one end capped and a coil spring having at least one coil with an outside diameter slightly larger than the minimum interior dimension across said tube to provide a positioned retaining frictional engagement inside said tube and the remaining turns of said coil extending toward said capped end, the method including positioning said housing tube in a retaining jig with the open end extending away from said jig positioning a die block having an aperture therein above the open end of said tube with said aperture in register with the opening in said tube, positioning rectifier plate stock over said die, punch out individual rectifier elements from said plate stock thereby forcing individual rectifier elements into the open end of said housing tube whereby individual rectifier elements are successively stacked in said tube against the larger end of said coil spring which prevents tumbling thereof.

5. The method of assembling cartridge type rectifiers in a housing tube having one end capped which method comprises the steps of inserting a coil spring having at least one coil with an outside diameter slightly larger than the minimum interior dimension across said tube into the open end of said tube with the smaller turns of said coil spring extending toward said capped end whereby said coil spring is retained in frictional engagement inside said tube by said coil of larger diameter positioning said housing tube in a retaining jig with the open end extending away from said jig, positioning a die block having an aperture therein above the open end of said tube with said aperture in register with the opening in said tube, positioning rectifier plate stock over said die, punch out individual rectifier elements from said plate stock thereby forcing individual rectifier elements into the open end of said housing tube whereby individual rectifier elements are successively stacked in said tube against the larger end of said coil spring which prevents tumbling thereof.

References Cited

UNITED STATES PATENTS

| | | | |
|---|---|---|---|
| 638,731 | 12/1899 | Macrae | 83—93 |
| 1,908,800 | 5/1933 | Utne | 317—234 |
| 2,000,159 | 5/1935 | Bolognino | 83—93 |
| 2,156,054 | 4/1939 | Geisler et al. | |
| 2,408,052 | 9/1946 | Enderlin. | |
| 2,444,255 | 6/1948 | Hewlett | 317—241 |
| 2,454,846 | 11/1948 | Skinner. | |
| 2,459,788 | 1/1949 | Bonner. | |
| 2,651,745 | 9/1953 | Marrow | 317—234 |
| 2,750,540 | 6/1956 | Waldkotter. | |
| 2,788,474 | 4/1957 | Jackson. | |
| 2,791,731 | 5/1957 | Walker. | |
| 2,817,797 | 12/1957 | Coyle. | |
| 2,854,609 | 9/1958 | Hedding. | |
| 2,879,582 | 3/1959 | Michal et al. | |
| 2,888,618 | 5/1959 | Lockett | 317—234 |
| 2,897,420 | 7/1959 | Butt. | |
| 2,922,091 | 1/1960 | Parrish et al. | |
| 3,032,179 | 5/1962 | Menolasino et al. | 206—42 X |
| 3,116,657 | 1/1964 | Rosenberg et al. | 83—92 |

JOHN W. HUCKERT, *Primary Examiner.*

A. M. LESNIAK, *Assistant Examiner.*